United States Patent Office 3,553,283
Patented Jan. 5, 1971

3,553,283
EPOXY RESIN CURED WITH POLYMERCAPTAN ESTER AS OLEFIN POLYMER COATING
Richard C. Doss, Bartlesville, Okla., assignor to Phillips Petroleum Company, a corporation of Delaware
No Drawing. Filed June 29, 1967, Ser. No. 649,856
Int. Cl. B65d 85/00; C08g 30/10, 30/14
U.S. Cl. 260—830
14 Claims

ABSTRACT OF THE DISCLOSURE

A 1-olefin polymer substrate is coated with an epoxy resin cured with a curing agent containing at least one ester group and at least three thiol groups per molecule to impart an impact resistant, hydrocarbon impermeable coating to the polyolefin. A fluid aliphatic polyamide can be added to the epoxy formulation prior to completion of curing to give a more uniform surface to the coating.

BACKGROUND OF THE INVENTION

This invention relates to coating a 1-olefin polymer substrate with an epoxy resin which is cured with a curing agent containing at least one ester group and at least three thiol groups per molecule and to the resulting coated layer.

The potential economies of manufacturing containers of all sizes and shapes of plastic material have attracted widespread interest in the plastics industry. It has been found, however, that plastics such as polyolefins are not always suitable for the fabrication of containers in which it is desired to be packaged liquids containing certain hydrocarbons, certain essential oils, and certain other materials which are of a generally non-polar nature. It has been found for instance that certain essential oils and hydrocarbons such as gasoline tend to permeate container walls which consist solely of a polyolefin.

Many solutions have been proposed to the problem of permeation of the polyolefin container. For example, Pinsky et al., 2,830,721, discloses that the permeation of polyolefin containers by hydrocarbons and the like can be reduced by coating the inner or outer surface of the container with an adherent coating of a cured epoxy resin. Generally, the epoxy resins employed are the reaction products of a polyol with a halohydrin. The most common of these epoxy resins are known as epichlorohydrin-bisphenol A resins. As disclosed in Pinsky et al. the epoxy resins are hardened or cured to an insoluble, generally infusible state by reacting the resins with a curing agent which can be for example a diamine, polyamine, diisocyanate, dialdehyde, dimercaptan, amide, or polyamide.

While certain of the combinations that Pinsky et al. discloses tend to reduce permeability to some extent, the cured resins disclosed in Pinsky et al., as well as other coatings heretofore broadly disclosed in the art, suffer from one or more defects. Either the permeation of the hydrocarbons is not reduced to a suitable level, or if the permeation is reduced to a suitable level, the cured epoxy coating becomes brittle and cracks or breaks, thereby reducing the effectiveness of the coating. In some instances good wetting of the polyolefin substrate, even after surface treatment such as flame treatment or the like, is difficult to obtain; there is a tendency for uneven evaporation of the solvent with the formation of surface blemishes such as fisheyes, and craters, and the like.

It has recently been proposed to use polyethylene in the manufacture of gasoline tanks. Polyethylene would be very advantageous since it could be molded into any desired form so that it could be placed in irregularly shaped spaces. The major problem with the use of polyethylene for gasoline tanks is permeation of polyethylene by hydrocarbons. Thus, in containers such as gasoline tanks, permeability to hydrocarbons must be reduced to an absolute minimum. In addition, the coating must exhibit excellent adhesion and impact resistance so as not to crack or peel when the tank is flexed or scuffed. It is apparent that this property is of paramount importance in an automobile gasoline tank which is subjected to vibration, scuffing, and the like in normal service.

SUMMARY OF THE INVENTION

It is an object of this invention to provide a strongly adherently-coated polyolefin container wall which is substantially impermeable to hydrocarbons and other substances that otherwise permeate polyolefin walls.

It is a still further object of this invention to provide a method for reducing permeability of polyolefin containers.

It is a still further object of this invention to provide an epoxy coating formulation suitable for forming an impact resistant hydrocarbon impermeable coating on a polyolefin substrate wherein said coating is substantially free of fisheyes, and craters and other surface blemishes.

According to the invention a 1-olefin polymer surface is coated with an epoxy resin which is cured with a curing agent containing at least one ester group and at least three thiol groups per molecule.

DESCRIPTION OF THE PREFERRED EMBODIMENTS

The combination of the epoxy resin and the particular curing agent of the instant invention provides a resinous composition with a relatively high degree of cross-linking and a high ester group density. This structure is highly impermeable to fluid hydrocarbons, is strongly adherent to polyolefin surfaces, and is impact resistant.

As used throughout this specification, the term "ester group" means the divalent radical

The epoxy materials are referred to as resins throughout this specification as is the accepted practice in the industry. However these materials, prior to curing, can be monomeric or polymeric and if polymeric, generally contain only about two to eight repeating chain units.

The epoxy resin formulations of this invention can be cured at a relatively low temperature, and produce a high gloss finish that is easy to maintain. Any epoxy resin having on the average at least two terminal epoxy groups

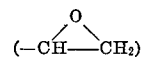

per molecule, such as the polyglycidyl ethers and polyglycidyl esters, can be used. Slight variation from this minimum of two is possible.

One class of epoxy resins which has been found to be particularly suitable for employment in the invention is obtained by reacting a haloepoxyalkane, preferably a chloro-1,2-epoxyalkane, with a polyol compound such as a polyphenolic compound exemplified by a bis(hydroxyphenyl)alkane. The product generally has at least two glycidyl groups. A commercially available form of this type of epoxy resin is the epichlorohydrin-bisphenol A type. These resins are commonly made by reacting epichlorohydrin with bisphenol A in the presence of a basic catalyst such as sodium hydroxide. This resin can be represented by the following formula:

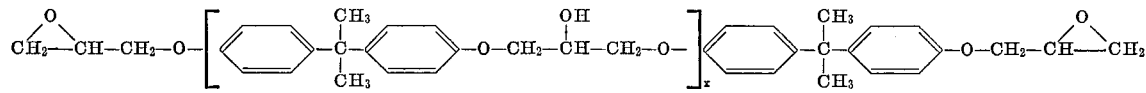

wherein x is generally in the range of 0–8.

A second group of epoxy resins which has been found to be particularly advantageous in the invention is the epoxy novolac resins. These are formed by reacting a phenol-formaldehyde condensation product with a halo-epoxyalkane, for example, epichlorohydrin, to convert the phenolic hydroxyl groups to glycidyl ether groups. In this type of resin the average number of epoxy groups per molecule is generally greater than 2. Such compounds having epoxy functionality of about 2 to about 8 are suitable for process of this invention. These epoxy compounds can be represented by the following formula:

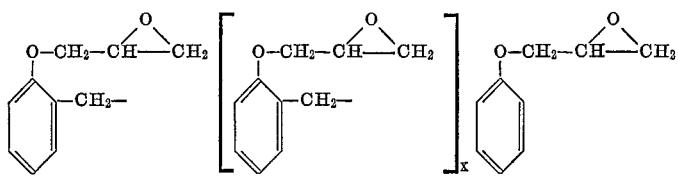

wherein x is generally as above.

The tetraphenylol ethane-epichlorohydrin resins can also be employed.

Another class of epoxy resins which has been found particularly suitable for the invention are the diepoxy polyesters. Generally, these resins can be formed by the reaction of a hydrocarbon dicarboxylic acid and a halo-epoxyalkane such as epichlorohydrin or by other methods known to the art. The reaction of epichlorohydrin with isophthalic acid produces diglycidyl isophthalate resin which has the following general formula:

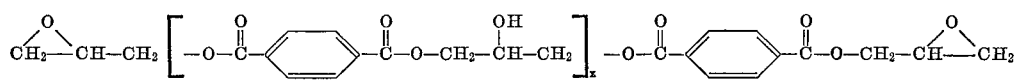

wherein x is generally as above.

The diglycidyl polyester resins of isophthalic acid represent the most preferred class of epoxy resins for the practice of the instant invention. Diglycidyl isophthalates can also be produced by the reaction of isophthaloyl chloride and glycidol. They can also be prepared by the epoxidation of diallylisophthalate.

Other examples to illustrate the scope of epoxy resins which can be used in the invention include: diglycidyl ether of dimerized linoleic acid; 1,2,4,5-diepoxypentane; di(3,4-epoxybutyl)adipate; di(2,3-epoxypropyl)phthalate; di(2,3-epoxypropyl)terphthalate; di(3,4 - epoxybutyl)sulfonyldibutyrate; di(4,5-epoxypentyl)thiodipropionate; diglycidyl aniline; terminally epoxidized olefins and the like.

The curing agents suitable for use in the process of this invention are preferably those represented by the following generic formula:

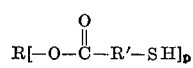

wherein R is a hydrocarbon group with a valence of $p$ that contains 3–20 carbons, R' is a divalent hydrocarbon group such as alkylene, cycloalkylene, or the like that contains 1–8 carbons, and $p$ is an integer in the range of 3–6. Examples of such hardeners where R is a hydrocarbon group that contains 3 to 6 carbon atoms include pentaerythrityl tetra(3-mercaptopropionate), erythrityl tetra(3-mercaptopropionate), pentaerythrityl tetra(4 - mercapto-cyclooctanecarboxylate), pentaerythrityl tetramercaptoacetate, glyceryl trimercaptoacetate, glyceryl tri(8 - mercaptooctanate), mannityl hexa(3 - mercaptopropionate), mannityl tetra(3 - mercaptopropionate), sorbityl hexa(4-mercaptobutyrate), 1,1,1 - tri(mercaptoethylcarbonyloxymethyl)propane, inosityl hexa(3 - mercaptopropionate), inosityl trimercaptoacetate, and the like.

The purity of the curing agent, for instance as measured by the acid number, has been found to be of significance in the practice of the instant invention. It is preferred to use a curing agent having an acid number (Lange, Handbook of Chemistry, 9th edition, p. 1719) of about 31 or below, more preferably of 9 or below. Curing agents of the instant invention having higher purity can be produced through the utilization of a simple filtering step during the preparation of the ester. For instance, in the preparation of pentaerythrityl tetra(3-mercaptopropionate) from pentaerythritol and 3-mercaptopropionic acid, the product mixture is filtered to remove polymer and other impurities before washing with base for neutralization of the mixture.

Suitable cure accelerators or catalyst can also be employed. Compounds exemplary of suitable accelerators include amines such as tertiary amines and precursors thereof. Examples of such accelerators include tris-2,4,6-(dimethylaminomethyl)phenol, diethylenetriamine, phenylenediamine, tri-n-hexylamine, benzyldimethylamine, morpholine, triethylenetetraamine, and the like.

Before the curable epoxy resin formulations are applied to the polyolefins of this invention, adequate surface preparation is highly desirable. The surface of the polyolefin should be treated in some manner to increase the surface energy such that proper wetting on the surface by the coating can occur. There are four general surface treatments normally employed with polyolefin substrates. The selection of the method to be employed can be governed by such factors as economics, contour of the surface to be treated, and the degree of adhesion required for the particular end use. Such treatments include (1) surface treatment with activated inert gases such as helium, (2) flame treatment, (3) corona discharge treatment, and (4) chromic acid-sulfuric acid treatment at elevated temperautre (70–100° C.).

Generally a diluent will be employed for the application of the coating compositions of this invention. The diluent can be any diluent that does not deleteriously affect the curing or other properties of the epoxy resin. Examples of diluents include methyl ethyl ketone, diethyl ether, tetrahydropyran, acetone, benzene, toluene, xylene, hexane, dioxane, Freons, propane, ethyl Cellosolve, ethoxy ethyl acetate and the like. Conventional double-line spray equipment can be used to apply the coating components. Other conventional additives can be included in the formulation such as pigments, fillers, metal powders, antistatic agents, leveling agents, and the like. In particular a small amount of carbon black, generally about 0.5 to 5 percent based on the weight of the epoxy resin and curing agent is desirable in applications where the coating is to be exposed to weathering.

The coating compositions of the instant invention, after application, can be cured in any conventional manner. Curing temperatures from 0° C. to 100° C. can be employed. However, one of the advantages of the epoxy resin coatings of the instant invention is that elevated temperatures are not normally required to cure the epoxy resin compositions. Normally, temperatures about 10° to 35° C., preferably of 15° to 25° C. are sufficient. The low temperature curing properties are desirable, as expensive high temperature curing equipment need not then be provided. Cure times of about 5 minutes to about 40 hours can be employed. Normally, cure times of about 10 to 30 minutes preferably 10 to 20 minutes are sufficient.

The coating compositions of this invention can be employed to coat all kinds of polyolefin substrates such as fibers and fabrics, films, sheets, and containers. In the case of containers and the like either the inner surface or the outer surface or both can be coated. The polyolefin can be any polymer of at least one 1-olefin having from 2–8 carbon atoms per molecule. Especially suitable are polymers and mixtures of polymers of 1-olefins selected from the group consisting of ethylene, propylene, butene, and mixtures thereof.

In a preferred embodiment, fluid aliphatic polyamides are employed as modifying agents to improve the characteristics of the coatings.

The polyamides that are employed as modifying agents according to the process of the instant invention are represented by the following generic formula:

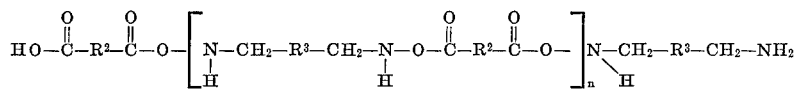

wherein $n$ is an integer of such value that substantially completely fluid products at room temperature are the result; wherein $R^2$ is a divalent aliphatic hydrocarbon group that can contain to three olefinic linkages and that contains in the range of about 4 to about 80 carbon atoms, preferably in the range of 16 to 50 carbon atoms; and wherein $R^3$ is a divalent aliphatic hydrocarbon group that contains about 1 to about 30 carbon atoms. Generally the value of $n$ is in the range of about 5 to 15. Preferably the $R^2$ group is substantially branched. The $R^3$ group can be saturated or can contain olefin unsaturation. Such polyamides can be obtained commercially or can be synthesized by any means known to the art. For example, olefinically unsaturated carboxylic acids such as oleic acid can be dimerized, and the resulting hydrocarbon dicarboxylic acid can be treated with an aliphatic diprimary diamine to produce suitable fluid aliphatic polyamides by means that are well known to the art. Also, suitable products, as described above, can be secured under the trade name "Versamid" from commercial sources.

The polyamides employed as modifying agents can be added to the curing epoxy resin coating at any time prior to substantial solidification of such coating compositions. Preferably, the polyamide modifying agent is added concurrently as the epoxy resin is contacted with the accelerator and curative; of course, any means known to the art can be employed to effect such addition. For example, the modifying agent can be premixed with the accelerator and/or curing agent prior to contacting those components with the epoxy resin.

The ratios of epoxy resin, curing agent, accelerator, and liquid aliphatic polyamide to be employed in this invention can readily be optimized by one skilled in the art for the particular result desired. In general, the ratio of thiol groups to epoxy groups will be about 0.5:1 to about 2:1, preferably about 0.83:1 to 1.2:1. The amount of amine or the like to be employed as an accelerator or catalyst will vary considerably depending on the amine, the epoxy resin, and the polymercaptan-polyester components of the system, the temperature, the rate of cure desired, and the like. In some instances, the accelerator can be eliminated or minimized in the formulation. However, in general, about 0.001 to 5 weight percent of accelerator, based on the weight of the epoxy resin and curing agent is most suitable. The fluid aliphatic polyamide is generally employed in amounts ranging from about 0.1 to about 5 (preferably 0.5 to 2) parts by weight of the polyamide per 100 parts by weight of the epoxy resin and curing agent. It is essential that the fluid aliphatic polyamide not be present in amounts sufficient to effect a significant amount of cure itself (fluid aliphatic polyamides at higher concentrations act as curing agents for epoxy resins) since it is desired to effect the cure with the curing agent containing at least one ester group and at least three thiol groups per molecule so as to achieve a coating having both high impact strength and good resistance to hydrocarbon permeation.

The invention will now be described with reference to the following examples:

Example I

Epoxy resin, hardener, and accelerator compositions were prepared by the following general method. To a reactor were charged 0.1 gram equivalents of epoxy resin, 0.1 gram equivalents of hardener, 0.73 weight percent of accelerator [tris(2,4,6 - dimethylaminomethyl)phenol] based on the total weight of epoxy resin and hardener, and, functioning as a diluent for the accelerator, 13 grams of either toluene or ethyl cellosolve (depending on other components). The reactor contents were thoroughly mixed in each case. This mixture in each instance was then applied to the polyolefin of each test, as is disclosed below.

The impact resistance of a coating is a composite measure of the toughness and adhesive strength of the coating. Modifications of reported methods were employed to measure this property as defined herein.

The above epoxy mixtures after complete mixing in each case were applied to a pretreated 3.0 inch x 5.0 inch x 0.125 inch panel made of 0.95 density (ASTM D 1505–63T), 0.3 melt index (ASTM D 1238–62T), Condition E) ethylene copolymer containing about 2 percent combined butene comonomer. After the solvent evaporated, in general, a tacky film formed which generally hardened within about 30 minutes, or less. The film thicknesses were usually about 1 to 2 mils. After post curing at 70–75° C. for one hour, the coated polyolefin samples were evaluated for impact resistance. Post curing was employed to develop complete cure for the control runs.

The pretreatment of the ethylene-polymer panel was as follows: The surface was wiped clean with acetone and immersed for 2–4 min. at 70–80° C. in a bath (consisting of 92 grams sodium dichromate, 800 ml. concentrated sulfuric acid, and 458 g. of distilled water). The treated surface was then rinsed with water and oven dried at 70° C. for one hour.

The impact resistance was measured by means of Gardner Variable Impact Tester. A weight was dropped from varying heights to the panel with impacts corresponding to forces ranging from 2 to 64-inch-pounds at intervals of 2 inch-pounds. The highest value that did not cause failure or the coating by cracking or loss of adhesion was noted in each case.

Results of the impact tests are set forth in Table I.

TABLE I

[Impact Resistance of Cured Epoxy Resin Coatings Applied to Ethylene Polymer Panels]

| | | Impact resistance, in.-lb. | | |
|---|---|---|---|---|
| | Hardner | Epon 828 [1] | Novolac 438 [2] | Diglycidyl isophthalate |
| Run 1 | Pentaerythrityl tetra (3-mercaptopropionate) | 44 | 16 | 40 |
| Control 1 | Mercapto-3-(2-mercaptoethyl) cyclohexane | >62 | <6 | 6 |
| Control 2 | Triethylentetraamine | 2 | 5 | 10 |
| Control 3 | | Barafene systen [3] = 12 | | |

[1] Epon 828, a trademark for a reaction product of 4,4'-isopropylidine-diphenol and epichlorohydrin, a Bisphenol-A type resin having the epoxide equivalent of 180 to 195.
[2] Novolac 438, a trademark for a reaction product of epichlorohydrin, phenol, and formaldehyde which produces a polyfunctional epoxide of equivalent weight 178, a novolac resin.
[3] Barafene, a trademark for a standard epoxy coating considered in the industry to be suitable for use on polyolefins. It is believed to be comprised of an epichlorohydrin-Bisphenol-A type epoxy resin and a hydroxylated aliphatic polyamine curing agent dissolved in ethyl cellosolve.

This example demonstrates that the cured epoxy resins of this invention, as exemplified by pentaerythrityl tetra (3-mercaptopropionate) cured epoxy resins (Run 1), yield coatings on polyolefins that have improved impact resistance over that of conventional cured epoxy coatings on polyolefins as represented by Controls 2 and 3.

While the dithiol hardener without ester linkages (Control 1) gave coatings of Epon 828 resins with high impact resistance, these coating will be shown in the following example (Example II) to have insufficient resistance to hydrocarbon permeation.

Example II

In this example, a series of tests were made to determine the effectiveness of various epoxy resin coatings in reducing the permeability of a polyolefin layer to hydrocarbons. Toluene was placed inside coated bottles and the permeability through the wall of the bottles was measured by determining weight loss. The outside surface of the polyethylene bottles (4 oz.) was surface treated in warm acid solution as were the panels in Example I.

The coating in each instance was applied by brush after it had been prepared as above. After standing for about 1–2 hours at room temperature the diluent had evaporated and the film had hardened. Although not necessary with the systems of this invention, a post cure at 70° C. was effected in each case for the sake of uniformity of test procedure in comparing the systems of this invention to other epoxy systems. The bottles were weighed both before and after the coating was applied to determine the weight of coating on each bottle. The amount of coating per bottle was usually between 0.5 and 0.7 gm. (surface area, 19.5 in.$^2$). Each bottle had added thereto 85 grams of toluene, and was then sealed. The bottles were kept at 25° C. and weighed periodically for one month. If the coating was extremely poor, the test was terminated when the toluene loss approached 40 percent.

The permeation rates determined in each case were multiplied by a factor to correct for differences in coating thickness as determined with the thickness of the Barafene (trademark) system employed as a standard. The results are presented in Table II.

TABLE II

| | Hardener | Resin | Permeation (percent wt., loss in 30 days) |
|---|---|---|---|
| Run 2 | Pentaerythrityl tetra(3-mercaptopropionate) | Diglycidylisophthalate | 0.5 |
| Run 3 | do | Novolac 438 [1] | 0.5 |
| Run 4 | do | Epon 828 [2] | 1.5 |
| Control 4 | Triethylenetetraamine | Diglycidylisophthalate | 0.3 |
| Control 5 | do | Novolac 438 [1] | 1.0 |
| Control 6 | do | Epon 828 [2] | 1.0 |
| Control 7 | Mercapto-3(2-mercaptoethyl) cyclohexane | Diglycidylisophthalate | 1.5 |
| Control 8 | do | Novolac 438 [1] | 6.0 |
| Control 9 | do | Epon 828 [2] | 27.0 |
| Control 10 | Barafene system (standard) [3] | | 12.0 |
| Control 11 | No coating | None | 27.0 |
| Control 12 | Versamid 140 [4] | Diglycidylisophthalate | ([5]) |
| Control 13 | do | Novolac 438 [1] | 34 |
| Control 14 | do | Epon 828 [2] | 33 |
| Control 15 | Thiokol LP-8 [6] | do.[2] | 35 |
| Control 16 | Methylnadic anhydride | do.[2] | 35 |

[1] Novolac 438, a trademark for a reaction product of epichlorohydrin, phenol, and formaldehyde which produces a polyfunctional epoxide of equivalent weight 178—a novolac resin.
[2] Epon 828, a trademark for a reaction product of 4,4'-isopropylidine-diphenol and epichlorohydrin—a Bisphenol-A type resin.
[3] Barafene, a trademark for a standard epoxy coating considered in the industry to be suitable for use on polyolefins. It is believed to be comprised of an epichlorohydrin-Bisphenol-A type epoxy resin and a hydroxylated aliphatic polyamine curing agent dissolved in ethyl Cellosolve.
[4] Versamid 140, a trademark for a polyamide resin prepared by reacting a $C_{36}$ dimer acid with a diprimary aliphatic diamine, having an amine value of about 385.
[5] Over 40% in 20 days.
[6] Thiokol LP-8, a trademark for a polysulfide, molecular weight about 500, thiol terminated.

The above table demonstrates that the hardeners of this invention as exemplified by pentaerythrityl tetra(3-mercaptopropionate) (Runs 2, 3, and 4) cure the epoxide resins of this invention to coatings on polyolefins that are greatly improved in barrier properties to hydrocarbons such as toluene. Though amines represented by triethylenetetraamine also cured the epoxy reins to impermeable coatings (Controls 4, 5, and 6), it is readily seen in Example I that such coatings are not at all suitable from the standpoint of impact resistance when applied to polyolefins. The only other system outside the scope of the instant invention to give a coating of good permeation resistance was the diglycidylisophthalate cured with mercapto-3(2-mercaptoethyl) cyclohexane (Control 7). However it is apparent from the data on impact resistance (Example I) that this material has insufficient impact strength to be of value as a coating for a polyolefin substrate which is to be subjected to any sort of rough handling. Other conventional hardeners such as amines, amides, sulfides, and anhydrides are noted to give coatings of little or no value in improving the resistance of a polyolefin layer to permeation by hydrocarbons (Controls 11–16). In Controls 13–16 the permeation values are above 27 (the value with no coating). This resulted from the fact that the actual values obtained on samples which had a thicker or thinner coating than Control 10 were multiplied by a factor so that all of the values are based on the same coating thickness. The value for uncoated Control 11 was not multiplied by any factor.

The polyethylene used was a homopolymer having a density of 0.96 (ASTM D 1505–63T) and a melt index of 0.9 (ASTM D 1238–62T, Condition E).

Example III

Hydrolytic studies were carried out on 4 oz. polyethylene bottles that had been pretreated by the warm acid procedure, coated, and cured as above. The bottles were filled with sand and sealed. The weighted bottles were immersed in boiling water for 2 hours after which they were removed, cooled, and inspected. The degree to which the coating was removed by such treatment was determined, and is reported below as percentage of original coated area deteriorated.

TABLE III

| | Hardener | Epoxy resin | Approximate percent coating removed from surface |
| --- | --- | --- | --- |
| Run 5 | Pentaerythrityl tetra(3-mercaptopropionate). | Diglycidylisophthalate | 5 |
| Run 6 | do | Novolac 438 [1] | 0 |
| Run 7 | do | Epon 828 [2] | 5 |
| Control 17 | | Barafene system (standard) [3] | 5 |
| Control 18 | Propanetrithiol | Epon 828 [1] | 100 |

[1] Novolac 438, a trademark for a reaction product of epichlorohydrin, phenol, and formaldehyde which produces a polyfunctional epoxide of equivalent weight 178—a novolac resin.
[2] Epon 828, a trademark for a reaction product of 4,4′-isopropylidine-diphenol and epichlorohydrin—a Bisphenol-A type resin.
[3] Barafene, a trademark for a standard epoxy coating considered in the industry to be suitable for use on polyolefins. It is believed to be comprised of an epichlorohydrin-Bisphenol-A type epoxy resin and a hydroxylated aliphatic polyamine curing agent dissolved in ethyl Cellosolve.

This example demonstrates that the coating compositions of this invention, as exemplified by Runs 5, 6, and 7, have good hydrolytic stability and compare favorably in this regard to commercial products as exemplified by Barafene. This example further demonstrates that ordinary polythiol cured resins, as exemplified by Control 18, do not have satisfactory hydrolytic stability. The same polyethylene was used as was used in Examples II.

Example IV

Environmental studies were carried out to determine the ability of the coatings to withstand various environmental exposure conditions such as sunlight, elevated temperatures, and high humidity. Test panels of coated polyolefin were prepared as in Example I. Some specimens were exposed to direct sunlight for 30 days at ambient temperatures (20° F. to 80° F.). The remainder were placed in a Weather-ometer (trademark, Atlas Electric Devices Company), Model 25–WR equipped with a 2500-watt M–2881 Xenon lamp which provided continuous exposure to light of a spectral distribution close to that of sunlight. The Weather-ometer was controlled for 300 hours at 130° F. with 45 percent humidity. At the end of the test periods, the specimens were inspected, and removal of film was determined as a percentage of the total coated area. None of the samples tested showed any loss of coating material.

This example shows that the cured epoxy coatings of this invention have good stability to environmental deterioration.

Example V

Permeation tests were carried out as in Example II except that the epoxy coatings were cured at different temperatures. Each of Runs 2, 3, and 4 (examples of the instant invention) were repeated at the following two different curing temperatures: (1) 25° C. for one hour and then 70° for one hour, and (2) 25° C. for 2 hours. No significant difference was shown in the permeability of these coatings cured under the different conditions. This example demonstrates that the cured epoxy coatings of this invention can be cured satisfactorily at relatively low temperatures.

Example VI

Novolac 438 epoxy resin was cured with a pentaerythrityl tetra(3-mercaptopropionate) curing system at 25° C. The amount of time and the amount of tertiary amine catalyst needed to effect cure is shown in the following Table IV. The tertiary amine catalyst used was DMP–30.[1] The pentaerythrityl tetra(3-mercaptopropionate) curing agent was present in an amount sufficient to give 1-thiol group per 1 epoxy group in all runs.

TABLE IV

| Polymercaptan polyester analysis | | Catalyst and time needed to effect cure of epoxy resin, minutes |
| --- | --- | --- |
| Percent SH | Acid No. | |
| 26.2 | [1] 9.3 | 0.05 g./30 |
| 24.3 | 31 | 0.20 g./30 |
| 25.3 | 48 | 0.20 g./300 |

[1] Filtered prior to wash.

This example shows that with a polymercaptan ester curing agent of low acid number, curing of the resin at much lower times and with lower amounts of catalyst is possible. It is apparent that the ten-fold reduction in time of cure at essentially room temperature (25° C.) is of great practical importance in the utilization of such epoxy coating sytsems.

Example VII

Epoxy resin, curative, accelerator, toluene diluent, and liquid aliphatic polyamide modifying agent were each charged to a reactor as outlined by the following recipes. The reactor contents in each case were thoroughly mixed. The mixture of each run was then applied to polyethylene panels. It was noted by visual observation that the formulation that included modifying agent allowed the solvent to evaporate more evenly and permitted a more even distribution of the coating. The presence of the polyamide modifying agent effectively reduced blemishes such as craters, fisheyes, and the like in the coating in comparison to the formulations that did not contain the fluid polyamide.

[1] See footnote 3, Table V.

TABLE V.—RECIPE

| Ingredients | Run 8—weight, gram | Run 9—weight, gram |
|---|---|---|
| Diglycidyl isophthalate (epoxy resin) | [1] 85.7 | [1] 85.7 |
| Pentaerythrityl tetra(3-mercaptopropionate) (curative) | [2] 64.3 | [2] 64.3 |
| Ethoxy ethyl acetate (solvent) | 135.0 | 135.0 |
| Xylene (solvent) | 30.0 | 30.0 |
| DMP-30 (accelerator) [3] | 0.6 | 0.6 |
| Carbon Black | 3.1 | 3.1 |
| Versamid 140 [4] | 3 | 0.0 |
| Surface appearance | ([5]) | ([6]) |

[1] Equivalent weight 178.6.
[2] Equivalent weight 133.9.
[3] DMP, a trademark for tris-2,4,6-(dimethylaminomethyl)phenol.
[4] Versamid 140, a trademark for a polyamide resin prepared by reacting C₃₆ dimer acid with a diprimary aliphatic diamine.
[5] Essentially no blemishes.
[6] Minor blemishes.

TABLE V(a).—RECIPE

| Ingredients | Run 10—weight, gram | Run 11—weight, gram |
|---|---|---|
| Novolac 438 [1] (epoxy resin) | [2] 85.7 | [2] 85.7 |
| Pentaerythrityl tetra(3-mercaptopropionate) (curative) | [3] 64.3 | [3] 64.3 |
| Ethoxy ethyl acetate (solvent) | 135.0 | 135.0 |
| Xylene (solvent) | 30.0 | 30.0 |
| DMP-30 (accelerator) [4] | 0.6 | 0.6 |
| Carbon Black | 3.1 | 3.1 |
| Versamid 140 [5] | 3 | 0.0 |
| Surface appearance | ([6]) | ([7]) |

[1] Novolac 438, a trademark for a reaction product of epichlorohydrin, phenol, and formaldehyde which produces a polyfunctional epoxide of equivalent weight 178—a novolac resin.
[2] Equivalent weight of 178.6.
[3] Equivalent weight of 133.9.
[4] DMP, a trademark for tris-2,4,6-(dimethylaminomethyl)phenol.
[5] Versamid 140, a trademark for a polyamide resin prepared by reacting a C₃₆ dimer acid with a diprimary aliphatic diamine.
[6] Essentially no blemishes.
[7] Minor blemishes.

This example shows that the coatings of the instant invention are rendered more uniform in surface appearance through the inclusion of a fluid aliphatic polyamide in the coating formulation.

While this invention has been described in detail for the purpose of illustration it is not to be construed as limited thereby, but is intended to cover all changes and modifications within the spirit and scope thereof.

What is claimed is:

1. A 1-olefin polymer substrate having a coating on at least one surface thereof, said coating comprising an epoxy resin cured with a curing agent containing at least one ester group and at least three thiol groups per molecule represented by the formula $$R[-O-\overset{O}{\underset{\|}{C}}-R'-SH]_p$$

wherein R is a hydrocarbon group with a valence of $p$ that contains 3–6 carbon atoms, R' is a divalent hydrocarbon group containing 1–8 carbon atoms, and $p$ is an integer in the range of 3–6, said curing agent being present in an amount so as to give a ratio of thiol groups to epoxy groups of from 0.5:1 to 2:1.

2. An article according to claim 1 wherein said epoxy resin is selected from the group consisting of epoxy resins having the formulas:

[chemical structures]

wherein $x$ is in the range of 0–8.

3. An article according to claim 1 wherein said curing agent comprises pentaerythrityl tetra(3-mercaptopropionate).

4. An article according to claim 1 wherein said curing agent comprises pentaerythrityl tetra(3-mercaptopropionate), said curing agent being further characterized by having an acid number of less than 31.

5. An article according to claim 1 wherein said curing agent comprises pentaerythrityl tetra(3-mercaptopropionate), said curing agent being further characterized by having an acid number of less than 9.

6. An article according to claim 1 wherein said coating contains in addition 0.5 to 2 parts by weight of a liquid aliphatic polyamide of the general formula:

$$HO-\overset{O}{\underset{\|}{C}}-R^2-\overset{O}{\underset{\|}{C}}-O-\left[\underset{H}{N}-CH_2-R^3-CH_2-N-O-\overset{O}{\underset{\|}{C}}-R^2-\overset{O}{\underset{\|}{C}}-O-\right]_n \underset{H}{N}-CH_2-R^3-CH_2-NH_2$$

per 100 parts by weight of said epoxy resin and said curing agent wherein $n$ is an integer of such value that a substantially completely fluid product at room temperature is the result; wherein $R^2$ is a divalent aliphatic hydrocarbon group containing up to three olefinic linkages and containing in the range of 4 to 80 carbon atoms; and wherein $R^3$ is a divalent aliphatic hydrocarbon group containing from about 1 to about 30 carbon atoms.

7. An article according to claim 1 wherein said 1-olefin polymer substrate is in the form of a container.

8. An article according to claim 7 wherein said container contains a fluid hydrocarbon, said coated substrate being characterized by improved resistance to permeation by said hydrocarbon.

9. An article according to claim 8 wherein said 1-olefin polymer is a polymer of 1-olefin selected from the group consisting of ethylene, propylene, butene, and mixtures thereof, wherein said container is a gasoline tank, and wherein said hydrocarbon is gasoline.

10. An article according to claim 9 wherein said epoxy resin is a diglycidyl ester of isophthalic acid, said curing agent is pentaerythrityl tetra(3-mercaptopropionate), and said coating contains in addition 0.001 to 5 weight percent, based on the weight of the total mixture of tris-2,4,6-(dimethylaminomethyl) phenol, and 0.1 to 5 parts by weight based on the weight of the total mixture of liquid aliphatic amide of the general formula:

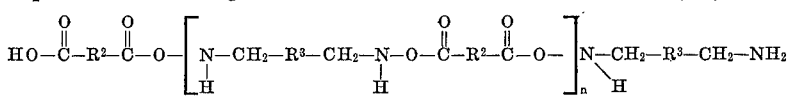

where $n$ is an integer of such value that a substantially completely fluid product at room temperature is the result; wherein $R^2$ is a divalent aliphatic hydrocarbon group containing up to three olefinic linkages and containing in the range of 4 to 80 carbon atoms; and wherein $R^3$ is a divalent aliphatic hydrocarbon group containing from about 1 to 30 carbon atoms.

11. An article according to claim 9 wherein: said epoxy resin is selected from the group consisting of epoxy resins having the formulas:

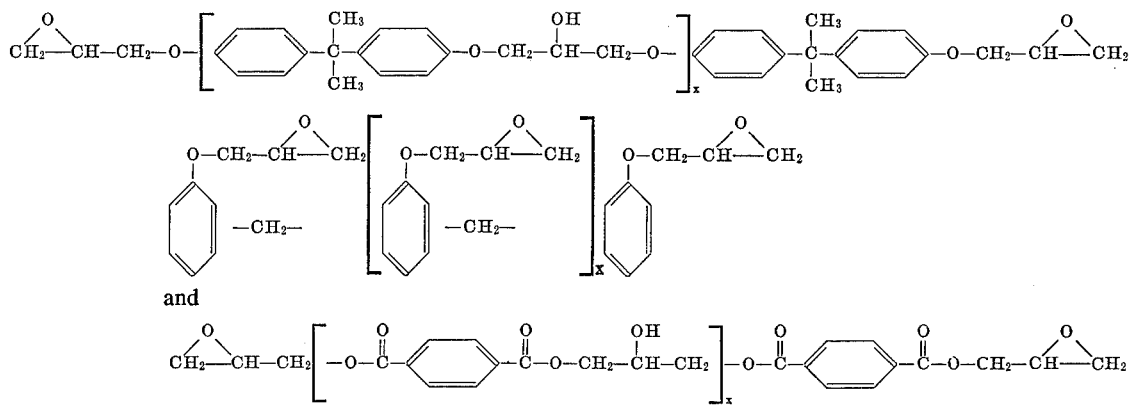

wherein $x$ is in the range of 0–8.

12. A composition of matter for forming a coating on a 1-olefin polymer substrate, said coating being characterized by a smooth surface comprising: an epoxy resin; a curing agent containing at least three ester groups and at least three thio groups per molecule represented by the formula

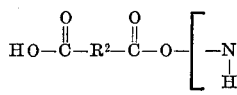

wherein R is a hydrocarbon group with a valence of $p$ that contains 3–6 carbon atoms, R' is a divalent hydrocarbon group containing 1–8 carbon atoms, and $p$ is an integer in the range of 3–6, said curing agent being present in an amount so as to give a ratio of thiol groups to epoxy groups of from 0.5:1 to 2:1; and from 0.5 to 2 parts by weight of a fluid aliphatic amide of the general formula:

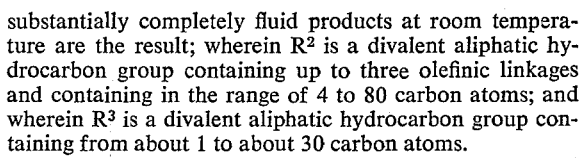

per 100 parts by weight of said epoxy resin and said curing agent wherein $n$ is an integer of such value that substantially completely fluid products at room temperature are the result; wherein $R^2$ is a divalent aliphatic hydrocarbon group containing up to three olefinic linkages and containing in the range of 4 to 80 carbon atoms; and wherein $R^3$ is a divalent aliphatic hydrocarbon group containing from about 1 to about 30 carbon atoms.

13. A composition according to claim 12 wherein: said epoxy resin is selected from the group consisting of epoxy resins having the formulas:

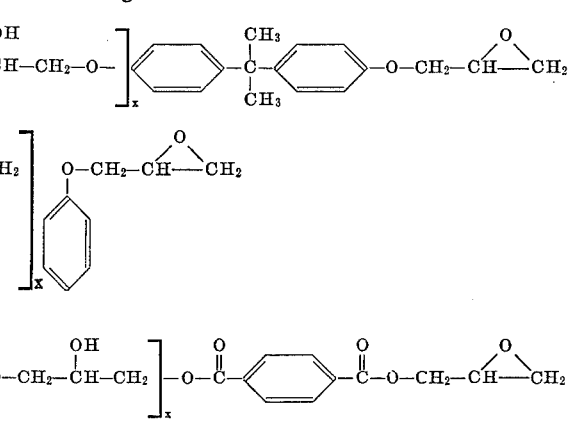

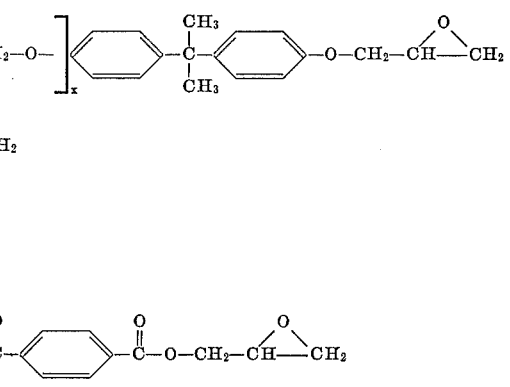

wherein $x$ is in the range of 0–8.

14. A composition according to claim 12 wherein said epoxy resin is a diglycidyl ester of isophthalic acid, said curing agent is pentaerythrityl tetra(3-mercaptopropionate), said fluid aliphatic amide is the reaction product of a $C_{36}$ dimer carboxylic acid and a diprimary aliphatic diamine, and said coating contains in addition 0.001 to 5 weight percent, based on the weight of the total mixture of tris-2,4,6-(dimethylaminomethyl) phenol.

References Cited

UNITED STATES PATENTS

| | | | |
|---|---|---|---|
| 3,352,810 | 11/1967 | Cameron et al. | 260—37X |
| 3,423,480 | 1/1969 | Arnold et al. | 260—18 |
| 3,369,040 | 2/1968 | DeAcetis | 260—47X |
| 3,355,512 | 11/1967 | DeAcetis et al. | 260—2X |
| 2,830,721 | 4/1958 | Pinsky | 215—1 |

FOREIGN PATENTS

| | | | |
|---|---|---|---|
| 1,044,715 | 10/1966 | Great Britain | 260—47EPC |
| 664,741 | 6/1963 | Canada | 260—47EPC |

DONALD E. CZAJA, Primary Examiner

C. W. IVY, Assistant Examiner

U.S. Cl. X.R.

215—1; 150—.5; 117—94, 138.8; 260—2, 18, 47, 830.